United States Patent
Haneda et al.

(10) Patent No.: US 7,640,375 B2
(45) Date of Patent: Dec. 29, 2009

(54) DMA CONTROLLER, METHOD, INFORMATION PROCESSING SYSTEM, AND PROGRAM FOR TRANSFERRING INFORMATION BLOCKS COMPRISING DATA AND DESCRIPTORS

(75) Inventors: Terumasa Haneda, Kawasaki (JP); Yuichi Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 191 days.

(21) Appl. No.: 11/237,666

(22) Filed: Sep. 29, 2005

(65) Prior Publication Data

US 2006/0168366 A1 Jul. 27, 2006

(30) Foreign Application Priority Data

Jan. 27, 2005 (JP) ............................. 2005-020383

(51) Int. Cl.
*G06F 13/28* (2006.01)
(52) U.S. Cl. .......................................... 710/22; 710/26
(58) Field of Classification Search ................... 710/26
See application file for complete search history.

(56) References Cited

U.S. PATENT DOCUMENTS

| | | | | |
|---|---|---|---|---|
| 6,145,025 | A * | 11/2000 | Lim .............................. | 710/22 |
| 6,370,601 | B1 | 4/2002 | Baxter | |
| 6,715,036 | B1 * | 3/2004 | Burton et al. ................. | 711/118 |
| 7,111,092 | B1 * | 9/2006 | Mitten et al. .................. | 710/52 |
| 7,225,278 | B1 * | 5/2007 | Baxter et al. .................. | 710/22 |
| 2004/0128407 | A1 | 7/2004 | Bennett | |
| 2005/0182863 | A1 * | 8/2005 | Wrigley et al. ................ | 710/22 |

FOREIGN PATENT DOCUMENTS

| | | |
|---|---|---|
| JP | 05-181786 | 7/1993 |
| JP | 5-216808 | 8/1993 |
| KR | 2004-0078110 | 9/2004 |
| WO | 03/050655 | 6/2003 |

OTHER PUBLICATIONS

Korean Patent Office Action dated Aug. 23, 2006 and issued in related Korean Patent Application No. 10-2005-0038572.
Office Action issued in corresponding Chinese Patent Application No. 200510072059.2, on Jul. 20, 2007.
Japanese Notice of Rejection Ground mailed Jun. 30, 2009, in corresponding Japanese patent application 2005-20383, two pages (and two pages of English translation).

* cited by examiner

*Primary Examiner*—Henry W. H. Tsai
*Assistant Examiner*—Kris Rhu
(74) *Attorney, Agent, or Firm*—Staas & Halsey LLP

(57) ABSTRACT

In a DMA control method in which a DMA controller transfers data in memory to an input/output device in accordance with the control information which is provided by a processing device to a DMA controller, a processing device implements a step in which the processing device sets an information block comprising the control information and the data in the memory; a step in which address information of the information block is provided by the processing device to the DMA controller; a step in which the DMA controller reads the information block from the memory based on the address information and extracts the control information; and a step in which the DMA controller transfers the data in the information block to the I/O device based on the control information.

11 Claims, 7 Drawing Sheets

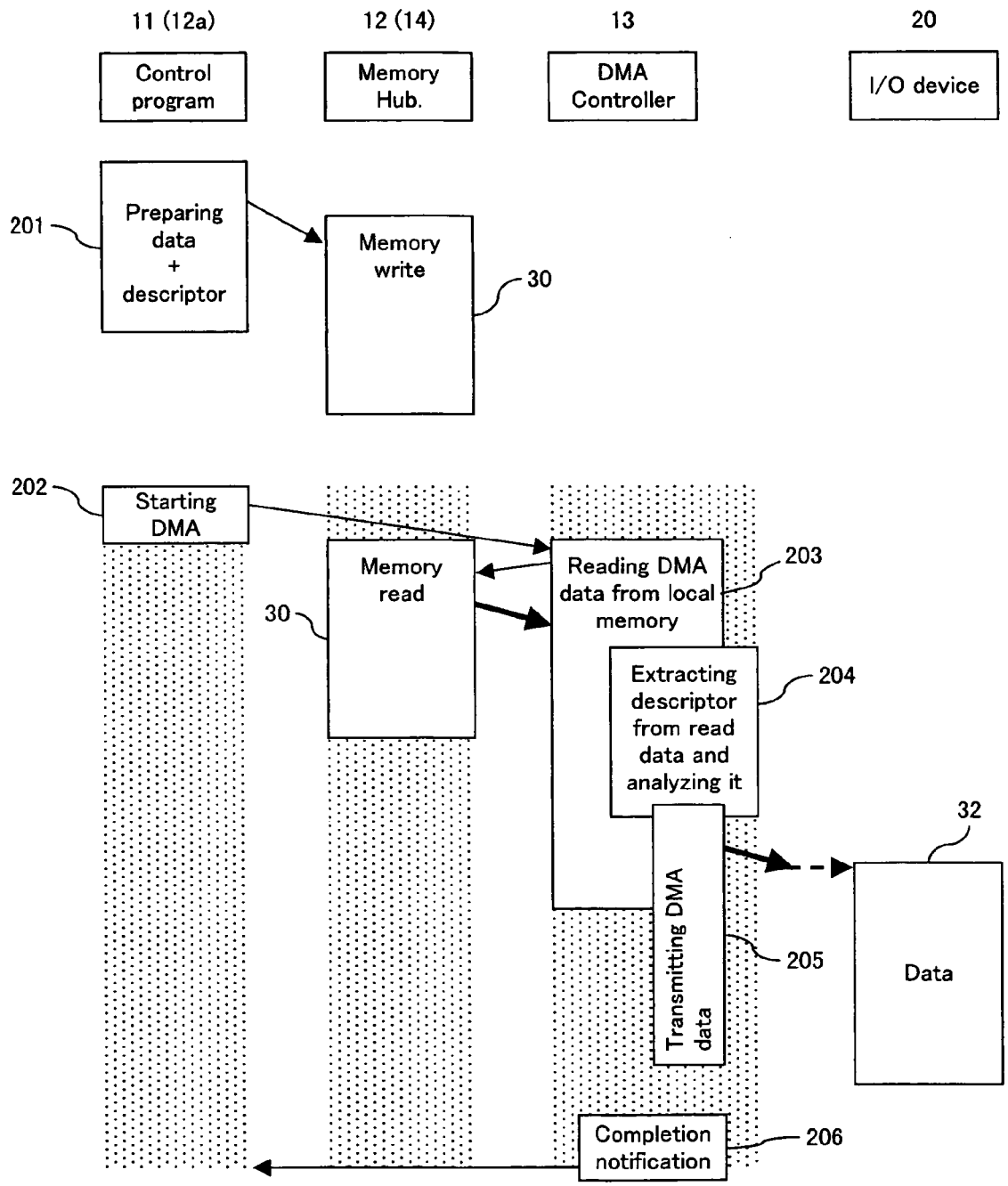
F I G. 1

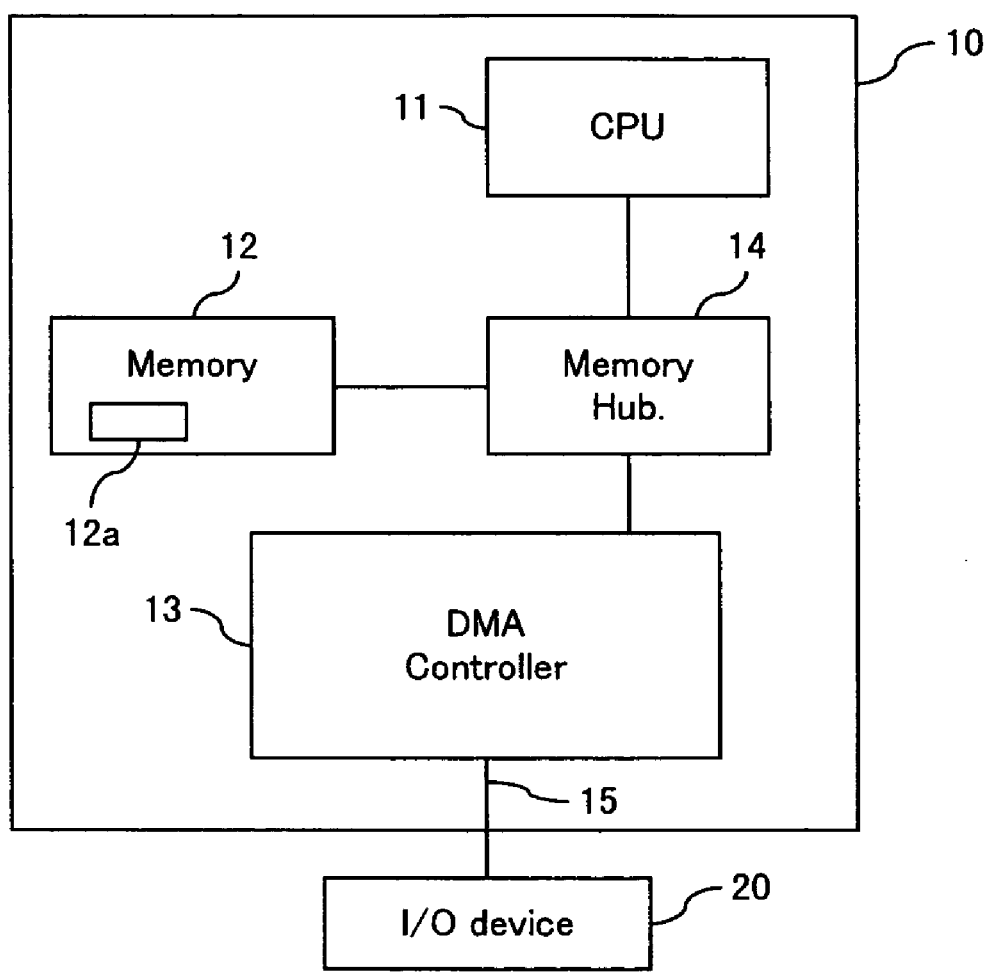
F I G. 3

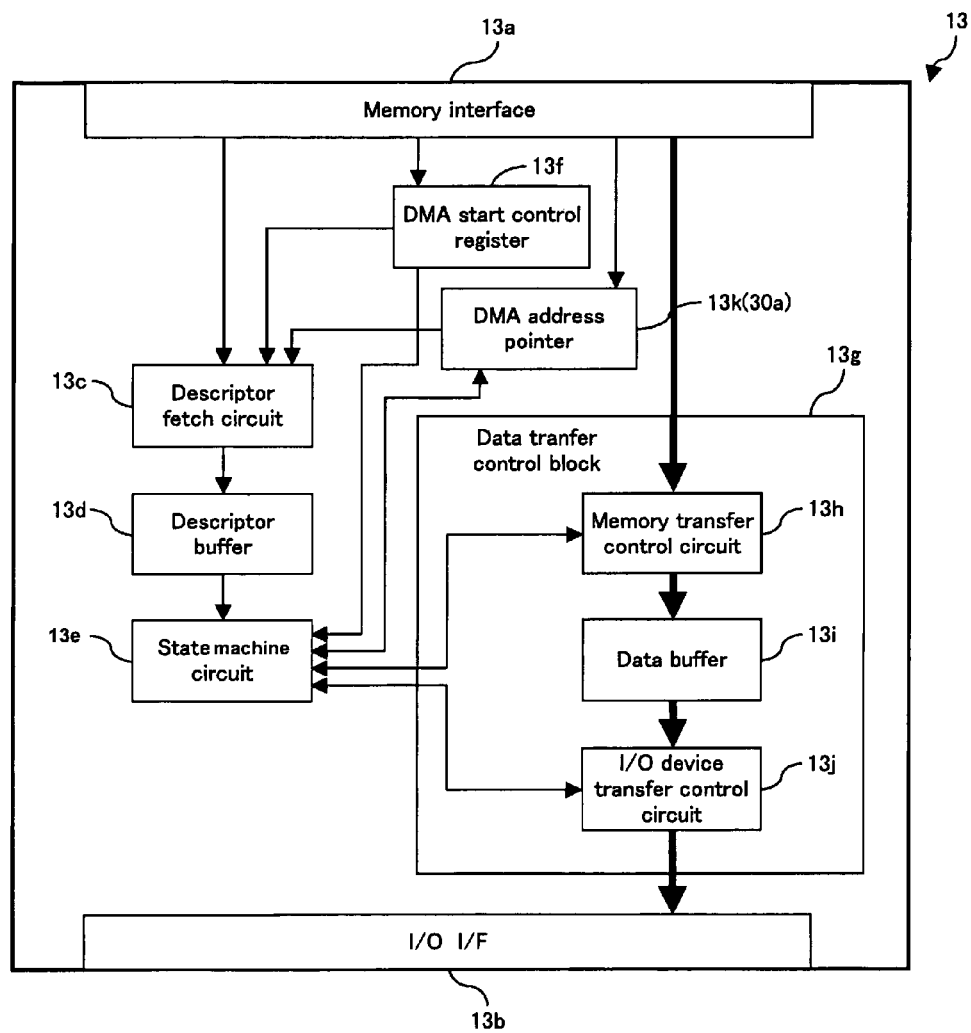
F I G. 4

DMA CONTROLLER, METHOD, INFORMATION PROCESSING SYSTEM, AND PROGRAM FOR TRANSFERRING INFORMATION BLOCKS COMPRISING DATA AND DESCRIPTORS

BACKGROUND OF THE INVENTION

1. Field of the Invention

The present invention relates to a direct memory access control technology, an information processing technology, and a program, and more specifically to an effective technology which applies to a direct memory access (DMA) technology, etc. in an information processing system which requires a high-speed data transfer.

2. Description of the Related Art

In a computer system, it is an important subject to implement data transfer effectively between memory and memory or between memory and an input/output device (I/O device) in order to improve the performance of the computer system. DMA is known as a method of solving this subject. (For example, refer to Patent Document 1)

An input/output (I/O) device transfers data to memory or receives data transferred from memory, and a storage device and an interface device are included in the I/O device. DMA is a mechanism in which dedicated hardware called a DMA control circuit controls data transfer based on instructions from a central processing unit (CPU) instead of the CPU controlling data transfer in the computer system.

In such a case, the CPU, memory and DMA control circuit are connected to one another via, for example, a memory hub, and the CPU, memory and DMA control circuit are supposed to transmit and receive data via this memory hub.

An instruction issued from the CPU to the DMA control circuit is called a descriptor, and a method by which the DMA circuit autonomously reads the descriptor from the memory and refers to the descriptor after the CPU prepares the descriptor in the memory has been widely used.

In other words, in a conventional method, apart from the data transferred by DMA to local memory under the control of the CPU, a descriptor in which control information (address of a transfer source, address of a transfer destination, transfer size, etc.) of DMA is included is developed.

When DMA is started by the CPU, the DMA circuit reads the descriptor and analyzes the control information, and transfers the data specified by the address of the transfer destination (local memory) to the I/O device by the data size designated by the descriptor.

As known from the above operation sequence, after the CPU prepares the descriptor and starts the DMA control circuit, the CPU can implement any other processing while data transfer is implemented, until DMA completion notification is provided to the CPU by an interrupt. Thus, the CPU is released from the comparatively simple process of data transfer and becomes available for more complicated processes, so that the performance of the system can be improved.

However, in the conventional DMA control technology in which a descriptor and data must be prepared separately in a memory, as described above, there are technical problems as follows.

In the case of the above conventional technology, in both "descriptor fetch" in which the DMA control circuit reads a descriptor and "data fetch" in which the DMA circuit reads data as the target of a DMA transfer, memory reading arises twice, and when reading such long data transfers that are generally implemented by DMA transfer are implemented in any interface via a memory hub, the overhead accompanied with data transfer becomes large because pre-fetch of the data is implemented in the memory hub.

Disclosed in Patent Document 1 is a technology which can change the functions of a DMA processing device by means of a program by associating each function of the DMA processing device with an instruction word, inputting a transfer processing procedure comprising an instruction word into a program storage area of the DMA processing device from outside, and implementing a transfer process in accordance with the function corresponding to the inputted instruction word, however, the aforesaid technical problems are not recognized in this technology.

Patent Document 1: Kokai (unexamined patent publication) No. 05-216808

SUMMARY OF THE INVENTION

The purpose of the present invention is to improve the efficiency in transferring data by DMA in an information processing system.

A first aspect of the present invention is to provide a DMA control method in which a DMA controller transfers data in memory to an input/output device in accordance with the control information which is provided by a processing device to the DMA controller, comprising:

a step in which the processing device sets an information block comprising the control information and the data in the memory;

a step in which address information of the information block is provided by the processing device to the DMA controller;

a step in which the DMA controller reads the information block from the memory based on the address information and extracts the control information; and a step in which the DMA controller transfers the data in the information block to the I/O device based on the control information.

A second aspect of the present invention is to provide a DMA control method in which the control information includes the address of a transmission destination of the data and the size of the data in the DMA control method according to the first aspect.

A third aspect is to provide a DMA controller which transfers data in memory to an I/O device in accordance with control information provided by a processing device, including:

An address setting unit in which address information of an information block, including the control information and the data in the memory is set by the processing device;

A buffer in which part of the information block which is read from the memory and includes the control information is stored; and A data transfer control unit which extracts the control information from the information block in the buffer and transfers the data included in the information block to the I/O device based on the control information.

A fourth aspect of the present invention is to provide an information processing system which comprises a processing device, memory, and a DMA controller which transfers data in the memory to an I/O device based on the control information provided by the processing device, wherein the processing device includes control logic for implementing the operation of setting an information block including the control information and the data in the memory and the operation of transmitting address information of the information block to the DMA controller; and the DMA controller reads the information block from the memory based on the address information transmitted from the processing device, extracts the control information included in the information block, and transfers the data included in the information block to the I/O device based on the control information.

A fifth aspect of the present invention is to provide a program which controls a processing device which causes a DMA controller to implement transfer processing, when transferring data from memory to an I/O device arises.

the operation of setting an information block including the control information and data which are required for the transfer processing in the memory; and the operation of providing address information of the information block and starting the DMA controller.

According to the present invention, the DMA controller can acquire data to be transferred and control information required for the DMA transfer processing of the data, from the memory as an integrated information block in a single memory access, so that the time required for memory access can be made shorter than that of the conventional technology, in which control information and data are accessed separately. As a result, it is possible to improve the efficiency of transferring data by means of DMA in an information processing system.

BRIEF DESCRIPTION OF THE DRAWINGS

FIG. 1 is a sequence showing an example of the operation of the information processing system which is an embodiment of the present invention.

FIG. 3 is a block diagram showing an example of the configuration of the information processing system which is an embodiment of the present invention.

FIG. 4 is a conceptual illustration showing an example of the configuration of a DMA controller included in the information processing system which is an embodiment of the present invention.

DESCRIPTION OF THE PREFERRED EMBODIMENT

Described below are the details of the embodiment of the present invention with reference to the accompanying drawings.

Figure 2:
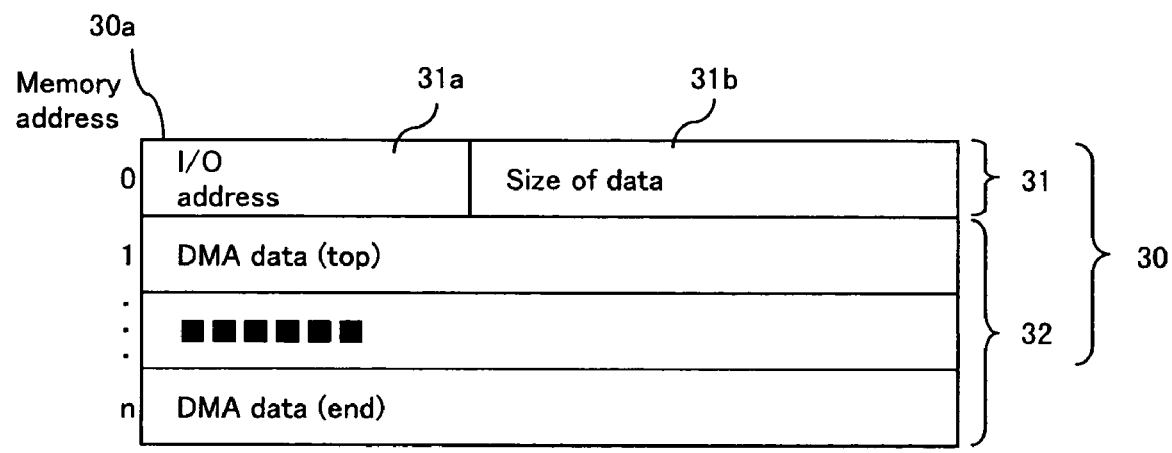
FIG. 2 is a conceptual illustration showing an example of the configuration of an information block used for DMA in the information processing system which is an embodiment of the present invention.
Figure 5:
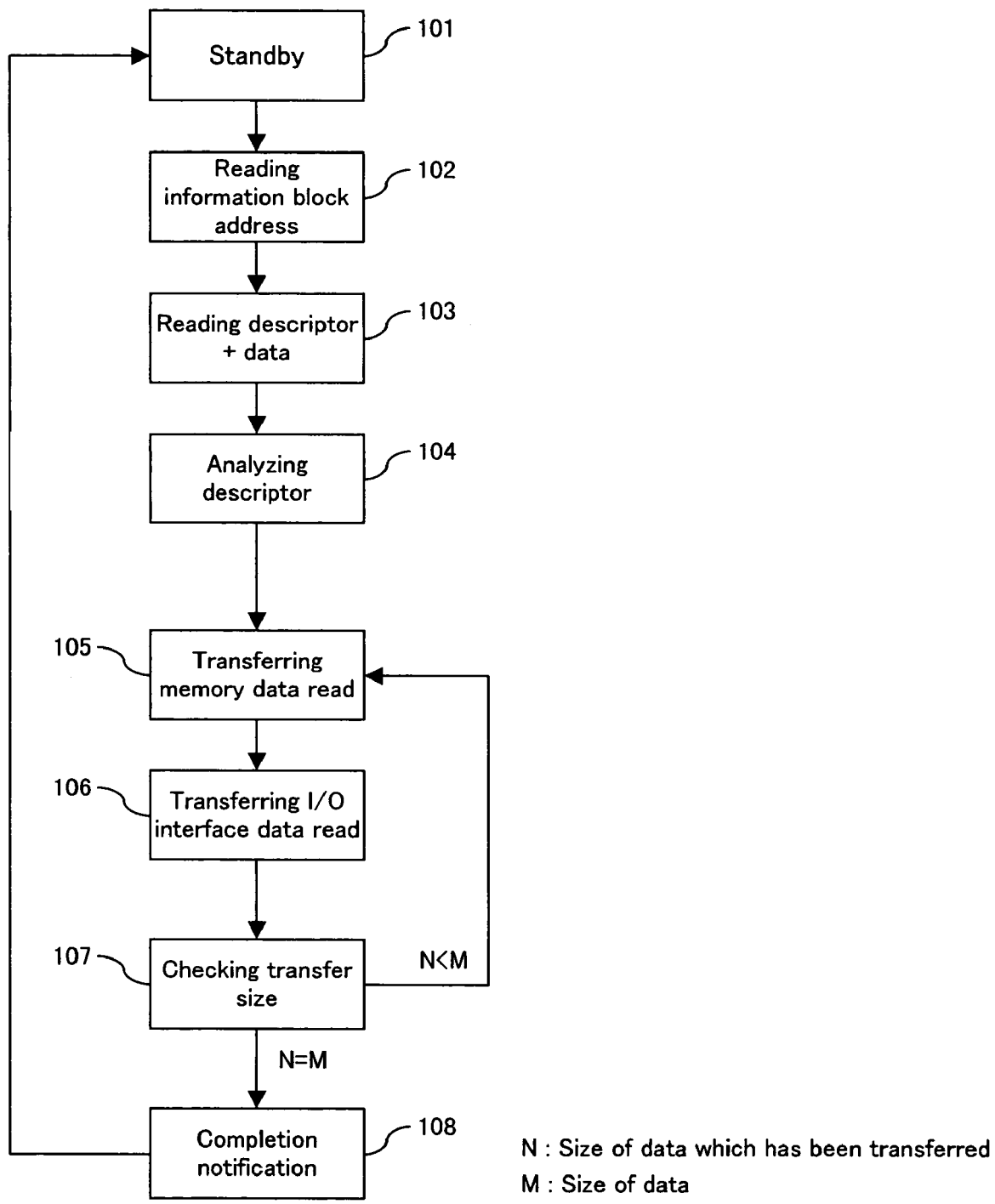
FIG. 5 is a flowchart showing an example of the operation of a DMA controller which is an embodiment of the present invention.
Figure 6:
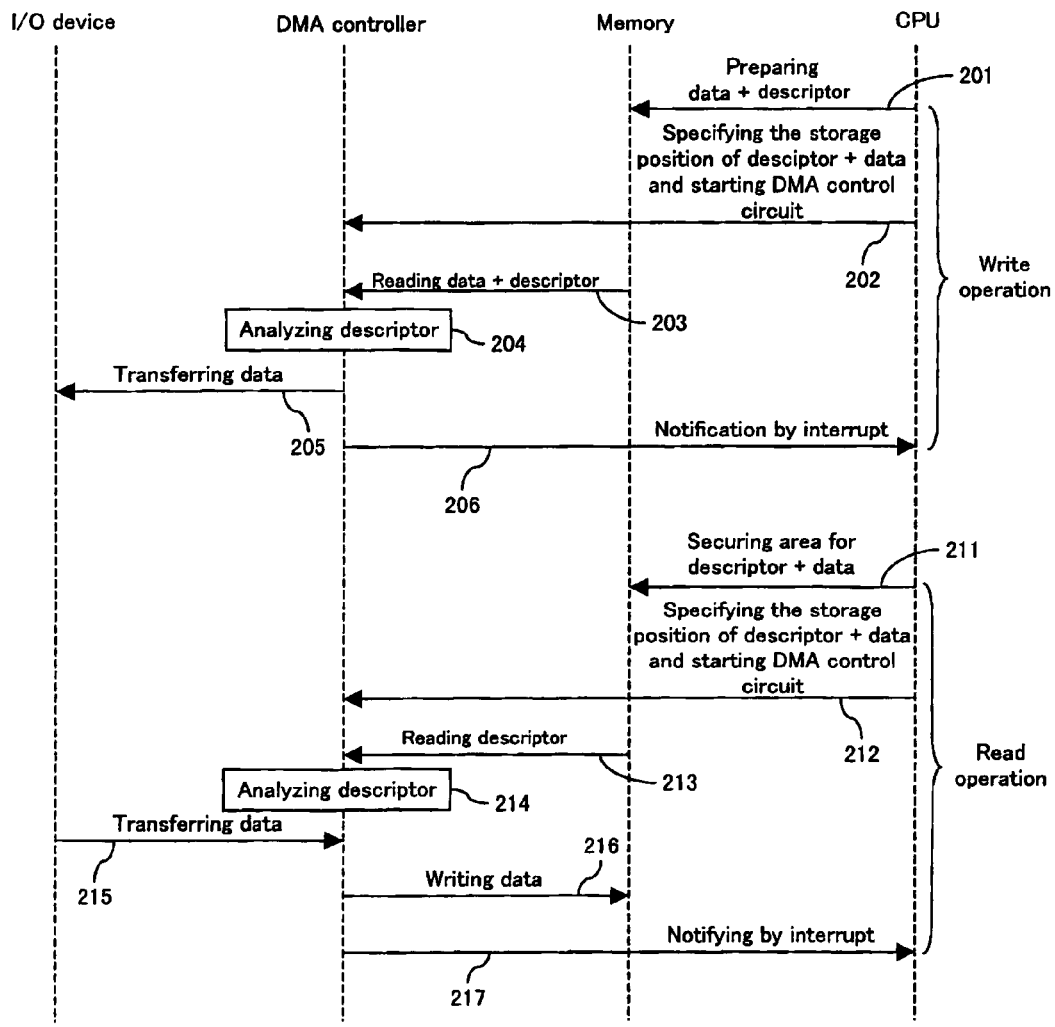
FIG. 6 is a sequence showing an example of the operation of the information processing system which is an embodiment of the present invention.
Figure 7:
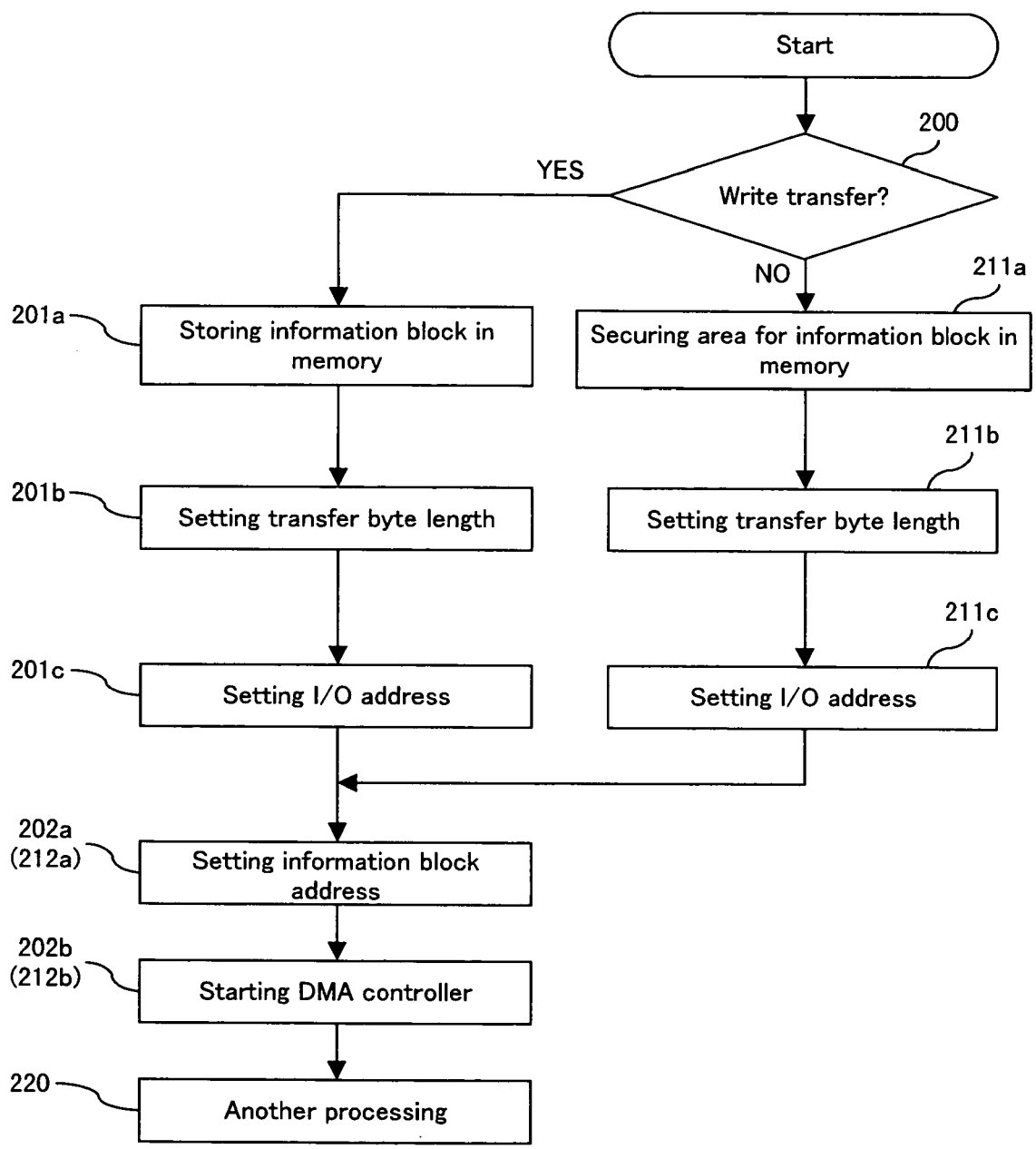
FIG. 7 is a flowchart showing an example of the operation of a CPU in the information processing system which is an embodiment of the present invention.

FIG. 1 is a sequence showing an example of the operation of the information processing system which is an embodiment of the present invention. FIG. 2 is a conceptual illustration showing an example of the configuration of an information block used for DMA in the information processing system which is an embodiment of the present invention. FIG. 3 is a block diagram showing an example of the configuration of the information processing system which is an embodiment of the present invention. FIG. 4 is a conceptual illustration showing an example of the configuration of a DMA controller included in the information processing system which is an embodiment of the present invention. FIG. 5 is a flowchart showing an example of the operation of a DMA controller which is an embodiment of the present invention. FIG. 6 is a sequence showing an example of the operation of the information processing system which is an embodiment of the present invention. FIG. 7 is a flowchart showing an example of the operation of a CPU in the information processing system which is an embodiment of the present invention.

The information processing system 10 in this embodiment comprises a CPU (central processing unit) 11, memory 12, a DMA controller 13, and a memory hub 14, as illustrated in FIG. 3.

The DMA controller 13 is connected to an I/O device 20 via an I/O interface 15.

A program to be executed by the CPU 11 and data are stored in the memory 12, and the required information processing is implemented by the CPU executing this program.

When data transfer is required between the memory 12 and the I/O device 20, the DMA controller 13 processes the data transfer in place of the CPU 11 by the CPU controlling the DMA controller 13, as described later.

Hereinafter, data transfer processing which the DMA controller 13 implements between the memory 12 and the I/O device in place of the CPU 11 is referred to as DMA (direct memory access).

In this embodiment, a control program 12a (control logic) in which the CPU 11 controls the DMA controller 13 to cause it to implement DMA is stored in the memory 12. This control program 12a causes the CPU 11 to implement the processing shown in FIG. 6 and FIG. 7.

In this embodiment, the control program 12a has the function of producing data 32 to be transferred and a descriptor 31 which is control information required for the DMA transfer control of the data 32 in the memory 12 as an information block, as shown in FIG. 2.

The control program 12a provides the top address of this information block 30 in the storage area in the memory 12 (hereinafter referred to as an information block address 30a) to the DMA controller 13 and causes the DMA controller 13 to implement DMA.

The DMA controller 13 in this embodiment comprises a memory interface 13a, I/O interface 13b, descriptor fetch circuit 13c, descriptor buffer 13d, state machine circuit 13e, DMA start control register 13f, data transfer control block 13g, and DMA address pointer register 13k (address setting unit), as shown in FIG. 4.

The memory interface 13a is connected to a memory hub 14. The I/O interface 13b is connected to the I/O device 20 via the I/O interface 15.

A DMA start command is set in the DMA start control register 13f by the CPU 11.

The information block address 30a indicating the storage position of the information block 30 in the memory 12 is set in the DMA address pointer register 13k by the CPU 11.

The state machine circuit 13e, when being started by the command set in the DMA start control register 13f, controls the whole of the DMA controller 13 so that the block information 30 may be read from the area of the memory 12 which is specified by the information block address 30a set in the DMA address pointer register 13k.

The descriptor fetch circuit 13c stores in the descriptor buffer 13d the top portion of the information block 30 including the descriptor 31 out of the information block 30 which is read from the memory 12 via the memory hub 14 and the memory interface 13a.

The state machine circuit 13e extracts and analyzes the descriptor 31 included in the information block 30 stored in the descriptor buffer 13d, and instructs data transfer to the data transfer control block 13g, and upon receiving an instruction from the state machine circuit 13e, the data transfer control block 13g implements data transfer between the memory interface 13a (memory 12) and the I/O interface 13b (I/O device 20).

The data transfer control block 13g comprises a memory transfer control circuit 13h, a data buffer 13i, and an I/O device transfer control circuit 13j.

The memory transfer control circuit 13h is initiated by the state machine circuit 13e, and implements data transfer between the memory 12 and the data buffer 13i via the memory interface 13a.

The I/O device transfer control circuit 13j is initiated by the state machine circuit 13e, and implements data transfer between the data buffer 13i and the I/O device 20 via the I/O interface 13b.

In this embodiment, the descriptor fetch circuit 13c stores in the descriptor buffer 13d the top portion of the information block 30 including the descriptor 31 out of the information block 30 which is read from the memory 12 to the data buffer 13i via the memory hub 14 and the memory interface 13a.

In other words, when the information block 30 is read from the memory 12 to the data buffer 13i via the memory interface 13a, the top portion of the information block 30 including the descriptor 31 is stored in parallel in the descriptor fetch circuit 13c.

Described below is an example of the operation of this embodiment.

When data in the memory 12 is transferred to an external I/O device 20 by means of DMA, as shown in FIG. 1, the CPU 11 which is controlled by the control program 12a produces the information block 30 comprising the descriptor 31 and the data 32 and stores the information block 30 in the memory 12 (Step 201).

Then, the CPU 11 sets in the DMA address pointer register 13k the information block address 30a which is the top address in the storage area of the information block 30 in the memory 12, and starts the DMA controller 13 (Step 202) by writing a write command (a data transfer instruction from the memory 12 to the I/O device 20) to the DMA start control register 13f.

The DMA controller 13 started by the CPU 11 accesses the memory 12 and reads the information block 30 (Step 203) based on the information block address 30a set in the DMA address pointer register 13k.

Then, the DMA controller 13 extracts the descriptor 31 from the read information block 30 and analyzes it (Step 204), and transfers data 32 to a target I/O device 20 specified by an I/O address 31a (Step 205).

In this data transfer, when the processing of transfer data 32 of the size specified by a transfer data size 31b is completed, the CPU 11 is notified of the completion of DMA, for example, by an interrupt (Step 206).

A detailed illustration of the operation of the DMA controller 13 at that moment is shown in the flowchart shown in FIG. 5. In other words, the DMA controller 13 monitors the DMA start control register 13f and is on standby (Step 101), and when a write command is written from the CPU 11 to the DMA start control register 13f, the DMA controller 13 reads the information block address 30a from the DMA address pointer register 13k (Step 102) and reads the information block 30 from the memory 12 based on this information block address 30a (Step 103).

At that time, the information block 30 is read into the data buffer 13i, and the descriptor 31 in the top portion of the information block 30 is read in parallel into the descriptor buffer 13d by the descriptor fetch circuit 13c.

The state machine circuit 13e analyzes the descriptor 31 in the descriptor buffer 13d, specifies information of the I/O address 31a and the transfer data size 31b (M) (Step 104), transfers the data 32 from the data buffer 13i to the target I/O device 20 specified by the I/O address 31a based on the I/O address 31a and the transfer data size 31b (Step 105, Step 106), and checks the transfer size (Step 107).

When the size N of the accumulated data which has already been transferred equals the size M of the data specified by the transfer data size 31b, the state machine circuit 13e transmits a transfer completion notification to the CPU 11 by interrupt, etc. (Step 108).

In the case of DMA from the I/O device 20 to the memory 12, processing illustrated in the lower part of FIG. 6 is implemented.

In other words, after the CPU 11 secures the storage area of the information block 30 in the memory 12 (Step 211), sets the transmission source address which specifies the I/O device 20 of the transmission source and the transfer data size 31b, in the descriptor of the information block 30 and sets the information block address 30a in the DMA address pointer register 13k, the CPU 11 sets a read command (a data transfer instruction from the I/O device 20 to the memory 20) in the DMA start control register 13f, and starts the DMA controller 13 (Step 212).

When the read command is set in the DMA start control register 13f, the DMA controller 13 reads the descriptor 31 of the information block 30 from the memory 12 (Step 213), analyzes the descriptor 31 (Step 214), reads transfer data from the I/O device 20 to the data buffer 13i (Step 215), and writes the transferred data to the data 32 area in the memory 12 (Step 216).

When the transfer is completed, the DMA controller 13 transmits a transfer completion notification to the CPU 11 by interrupt (Step 217).

The above described operation of the CPU 11 in the data transfer (write transfer) processing from the memory 12 to the I/O device 20, and in the data transfer (read transfer) processing from the I/O device 20 to the memory 12 is shown in the flowchart of FIG. 7.

First, the CPU 11 judges whether the data transfer is a write transfer (data transfer from the memory 12 to the I/O device 20) (Step 200), and if it is a write transfer, the CPU 11 stores the information block 30 in the memory 12 (Step 201a). Then, the CPU 11 sets a transfer byte length (M) in the transfer data size 31b of the descriptor 31 in the information block 30 (Step 201b), and sets the I/O address 31a which specifies the I/O device 20 of a transfer destination in the I/O address 31a (Step 201c).

Then, after the CPU 11 starts the DMA controller 13 (Step 202b) by setting the information block address 30a in the DMA address pointer register 13k (Step 202a) and setting a write command in the DMA start control register 13f, the CPU 11 proceeds to another processing (Step 220).

When the CPU 11 judges that the data transfer is not a write transfer (but a read transfer), the CPU 11 secures an area for storing the information block 30 in the memory 21 (Step 211a). Then, the CPU 11 sets the transfer byte length (M) in the transfer data size area 31b in the area of the descriptor 31 in the storage area of the information block 30 (Step 211b), and further sets the I/O address 31a which specifies the I/O device 20 of a transfer destination in the area of the I/O address 31a (Step 211c).

Next, after the CPU 11 starts the DMA controller 13, by setting the information block address 30a in the DMA address pointer register 13k (Step 212a) and setting a write command in the DMA start control register 13f (Step 202b), the CPU 11 proceeds to another processing (Step 220).

While the aforesaid "another processing" is being implemented, the CPU 11 receives a DMA completion notification from the DMA controller 13 by interrupt, etc., as described above.

According to this embodiment, the CPU 11 stores the data 32 and the descriptor 31 required to control the DMA processing of the data 32 in the information block 30, in the memory 12 as an integrated group, and reads this information block in a single read access from the DMA controller 13 to the memory 12, so that the occurrence of overhead when the descriptor 31 and the data 32 are read separately from the memory 12 can be avoided, and DMA processing from the memory 12 to the I/O device 20 can be effectively implemented in a short time.

Other DMA controllers in addition to interface devices and storage devices such as a magnetic disk device, optical disk device, magnet-optical disk device, and tape device can be connected to the DMA controller 13 in the information processing system as the I/O device 20.

A storage device is described as an example of the information processing system. The storage device comprises a memory shared by a plurality of access devices such as a host computer and a storage control device which controls data transfer between the memory and the access devices. In this case, the memory corresponds to the I/O device 20, and the storage control device corresponds to the information processing system 10. By applying the present invention to the storage device, the efficiency of data transfer from the storage device to the memory can be improved.

It is needless to say that the present invention can be changed within a range not exceeding its purport without being limited to the configuration shown in the above embodiment.

According to the present invention, it is possible to improve the efficiency of transferring data by means of DMA in an information processing system.

What is claimed is:

1. A direct memory access (DMA) control method in which a DMA controller transfers data in memory to an input/output device, or transfers data from the input/output device to the memory, in accordance with control information which is provided by a processing device to the DMA controller, comprising:

transferring by the DMA controller the transfer data in the memory to the input/output device by:
producing by the processing device an information block including the control information, which is a descriptor as an instruction issued from the processing device to the DMA controller, and including the transfer data,
storing the information block in the memory,
setting by the processing device in a DMA address pointer register an address of the information block, which is a top address in a storage area of the information block in the memory, and starting the DMA controller by writing a write command which is a data transfer instruction from the memory to the input/output device to a DMA start control register,
accessing by the started DMA controller the memory and reading the information block based on the information block address set in the DMA address pointer register,
extracting by the started DMA controller the descriptor from the read information block, analyzing the descriptor, and transferring the transfer data to the input/output device, and
notifying, by the started DMA controller, the processing device of a completion of the transfer data by an interrupt when a processing of the transfer data of a size specified by a transfer data size is completed; and transferring by the DMA controller the transfer data from the input/output device to the memory by:
securing by the processing device the storage area of the information block in the memory, setting a transmission source address, which specifies the input/output device of the transmission source and a transfer data size, in the descriptor of the information block and setting the information block address in the DMA address pointer register,
setting by the processing device a read command which is a data transfer instruction from the input/out device to the memory in a DMA start control register, and starting the DMA controller,
reading by the started DMA controller the descriptor of the information block from the memory, analyzing the descriptor, reading the transfer data from the input/output device to a data buffer, and writing the transferred data to the secured storage area in the memory, and
notifying, by the started DMA controller, the processing device of a completion of the transfer data by an interrupt when a processing of transfer data of the size specified by the transfer data size is completed.

2. The DMA control method according to claim 1, wherein the control information includes an address of a transmission destination of the transfer data and the size of the transfer data.

3. The DMA control method according to claim 1, wherein the processing device, the memory, and the DMA controller transmit and receive information to and from one another via a memory hub.

4. A DMA controller which transfers data in memory to an input/output device or transfers data from the input/output device to the memory, in accordance with control information provided by a processing device, comprising:
the DMA controller transfers the transfer data in the memory to the input/output device by:
in response to the processing device that executes:
producing an information block including the control information, which is a descriptor as an instruction issued from the processing device to the DMA controller, and including the transfer data,
storing the information block in the memory,
setting in a DMA address pointer register an address of the information block which is a top address in a storage area of the information block in the memory, and
starting the DMA controller by writing a write command, which is a data transfer instruction from the memory to the input/out device, to a DMA start control register,
the DMA controller:
accesses the memory and reads the information block based on the information block address set in the DMA address point register, extracts the descriptor from the read information block, analyzes the descriptor, and transfers the transfer data to the input/output device, and notifies the processing device of a completion of the transfer data by an interrupt when a processing of the transfer data of a size specified by a transfer data size is completed; and the DMA controller transfers the transfer data from the input/output device to the memory:

in response to the processing device that executes:

securing the storage area of the information block in the memory, setting a transmission source address, which specifies the input/output device of the transmission source and a transfer data size, in the descriptor of the information block and setting the information block address in the DMA address pointer register, and setting a read command, which is a data transfer instruction from the input/output device to the memory, in a DMA start control register, and starting the DMA controller the DMA controller:

reads the descriptor of the information block from the memory, analyzes the descriptor, reads the transfer data from the input/output device to the data buffer, and writes the transferred data to the secured storage area in the memory;

notifies the processing device of a completion of the transfer data by an interrupt when a processing of transfer data of the size specified by the transfer data size is completed.

5. The DMA controller according to claim 4, wherein the control information includes an address of a transmission destination of the transfer data and the size of the transfer data.

6. The DMA controller according to claim 4, wherein the DMA controller is connected to the processing device and the memory via a memory hub.

7. An information processing system transferring data to and from an input/output device, comprising:

a memory;

a DMA controller, and a processing device that transfers data in the memory to the input/output device by:

producing an information block including control information, which is a descriptor as an instruction issued from the processing device to the DMA controller, and including the transfer data, storing the information block in the memory, setting in a DMA address pointer register an address of the information block which is a top address in a storage area of the information block in the memory, and starting the DMA controller by writing a write command, which is a data transfer instruction from the memory to the input/out device, to a DMA start control register, wherein the DMA controller started by the processing device executes:

accessing the memory and reading the information block based on the information block address set in the DMA address pointer register, extracting the descriptor from the read information block, analyzes the descriptor, and transferring the transfer data to the input/out device, and notifying the processing device of a completion of the transfer data by an interrupt when a processing of the transfer data of a size specified by a transfer data size is completed, wherein the processing device transfers the transfer data from the input/output device to the memory by:

securing the storage area of the information block in the memory, setting a transmission source address, which specifies the input/output device of the transmission source and a transfer data size, in the descriptor of the information block and setting the information block address in the DMA address pointer register, setting a read command, which is a data transfer instruction from the input/out device, to the memory in a DMA start control register, and starting the DMA controller, wherein the DMA controller started by the processing device executes:

reading the descriptor of the information block from the memory, analyzing the descriptor, reading the transfer data from the input/output device to a data buffer, and writing the transferred data to the storage area in the memory, and notifying the processing device of a completion of the transfer data by an interrupt when a processing of transfer data of the size specified by the transfer data size is completed.

8. The information processing system according to claim 7, wherein the control information includes an address of a transmission destination of the transfer data and the size of the transfer data.

9. The information processing system according to claim 7 which further includes a memory hub to which the processing device, the memory and the DMA controller are connected, wherein the processing device, the memory and the DMA controller transmit and receive information to and from one another via the memory hub.

10. A memory storing a program for controlling a processing device for causing a DMA controller to implement a transfer processing when transferring data from the memory to an input/output device or when transferring data from the input/output device to the memory, according to operations comprising:

transferring by the DMA controller the transfer data in the memory to the input/output device by:

producing by the processing device an information block including the control information, which is a descriptor as an instruction issued from the processing device to the DMA controller, and including the transfer data, and storing the information block in the memory, setting by the processing device in a DMA address pointer register an address of the information block, which is a top address in a storage area of the information block in the memory, starting the DMA controller by writing a write command, which is a data transfer instruction from the memory to the input/output device, to a DMA start control register, accessing by the started DMA controller the memory and reading the information block based on the information block address set in the DMA address pointer register, extracting by the started DMA controller the descriptor from the read information block, analyzing the descriptor, and transferring the transfer data to the input/output device, and notifying, by the started DMA controller, the processing device of a completion of the transfer data by an interrupt when a processing of the transfer data of a size specified by a transfer data size is completed: and transferring by the DMA controller the transfer data from the input/output device to the memory by:

securing by the processing device the storage area of the information block in the memory, setting a transmission source address, which specifies the input/output device of the transmission source and a transfer data size, in the descriptor of the information block and setting the information block address in the DMA address pointer register, setting by the processing device a read command, which is a data transfer instruction from the input/out device, to the memory in a DMA start control register, and starting the DMA controller, reading by the started DMA controller the descriptor of the information block from the memory, analyzing the descriptor, reading the transfer data from the input/output device to a data buffer, and writing the transferred data to the secured storage area in the memory, and notifying, by the started DMA controller, the processing device of a completion of the transfer data by an interrupt when a processing of transfer data of the size specified by the transfer data size is completed.

11. The memory containing a program according to claim 10, wherein the control information includes an address of a transmission destination of the data and the size of the data.

\* \* \* \* \*